Sept. 3, 1968  ASATARO HASUMI ET AL  3,400,001
CERAMIC DIELECTRIC FOR TEMPERATURE
COMPENSATING ELECTRIC CONDENSERS
Filed Aug. 30, 1966
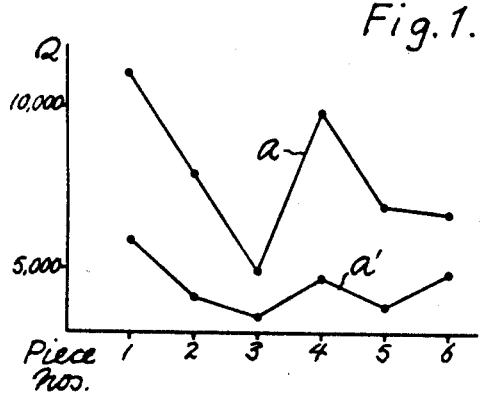
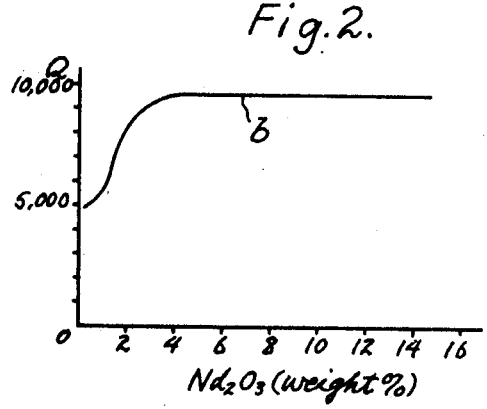
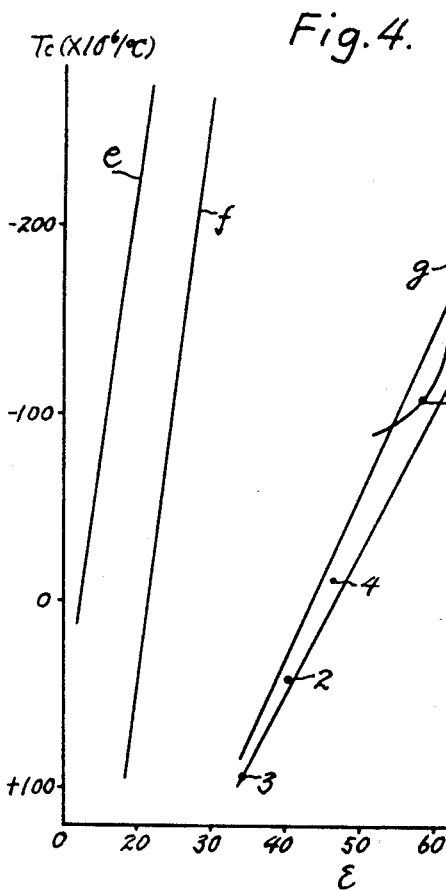
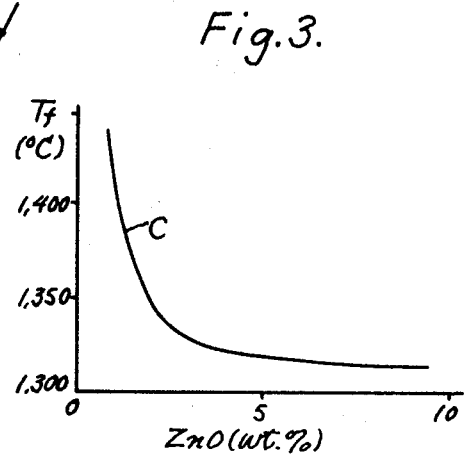
Asataro Hasumi and
Masato Kogure,
INVENTORS
BY Wenderoth, Lind
and Ponack,
Attorneys

United States Patent Office 3,400,001
Patented Sept. 3, 1968

3,400,001
CERAMIC DIELECTRIC FOR TEMPERATURE COMPENSATING ELECTRIC CONDENSERS
Asataro Hasumi, Takasakishi, Gunmaken, and Masato Kogure, Annakashi, Gunmaken, Japan, assignors to Taiyo Yuden Company Limited, Tokyo, Japan, a limited-liability company of Japan
Filed Aug. 30, 1966, Ser. No. 576,029
Claims priority, application Japan, Feb. 8, 1966, 41/7,079
1 Claim. (Cl. 106—39)

ABSTRACT OF THE DISCLOSURE

Ceramic dielectric for temperature compensating electric condensers, which is composed of:

| | Percent by weight |
|---|---|
| $CaO \cdot xTiO_2$ ($x = 1.2$ to $1.8$) | 20.1–51.5 |
| $Mg_2TiO_4$ | 26.0–10.0 |
| $La_2O_3$ | 33.0–16.4 |
| $Nd_2O_3$ | 1.6–10.6 |
| $Bi_2O_3$ | 4.5–9.0 |
| $ZnO$ | 8.0–2.0 |
| $CeO_2$ | |
| $Pr_6O_{11}$ and/or | 6.8–0.5 |
| $Sm_2O_3$ | | has a temperature coefficient of $-260$ to $+100 \times 10^{-6}/°$ C., a dielectric constant of 35 to 80, a Q of 5000 to 10,000, and a firing temperature of 1270° to 1340° C.

---

This invention relates to ceramic dielectric for temperature compensating electric condensers.

In the past, as ceramic dielectrics for temperature compensating electric condensers having temperature coefficient at the range of $-260$ to $+100 \times 10^{-6}/°$ C., ceramics of $MgO$-$TiO_2$ system, $CaTiO_3$-$MgTiO_3$ system and $CaTiO_3$-$MgTiO_3$-$La_2O_3$-$Bi_2O_3$ system are known. The ceramics of the former two systems have firing temperature of about 1,350° C., but have a defect of comparatively low dielectric constant of 15–30, and the ceramics of the latter system have comparatively high dielectric constant of 30–80, but have defects of comparatively high firing temperature of 1,380–1,400° C. and low Q of 200–1,000.

The chief object of the invention is to provide ceramic dielectric for temperature compensating electric condensers, which is composed of 20.1–51.5 weight percent of $CaO \cdot (1.2$–$1.8)TiO_2$, 26.0–10.0 weight percent of $Mg_2TiO_4$, 33.0–16.4 weight percent of $La_2O_3$, 1.6–10.6 weight percent of $Nd_2O_3$, 4.5–9.0 weight percent of $Bi_2O_3$, 8.0–2.0 weight percent $ZnO$ and 6.8–0.5 weight percent of one or more of $CeO_2$, $Pr_6O_{11}$ and $Sm_2O_3$, and has a temperature coefficient at the above stated range, a comparatively high dielectric constant of 35–80, a high Q of 5,000–10,000 and a comparatively low firing temperature of 1,270–1,340° C.

Other features and advantages of the invention will be apparent from the following description.

In the accompanying drawing:
FIG. 1 is a graph showing the difference of Q between embodiments of the invention and ceramic dielectrics produced by replacing $Nd_2O_3$ by $La_2O_3$ in said embodiments;
FIG. 2 is a graph showing the change of Q in case of varying the quantity of $Nd_2O_3$ in one of said embodiments;
FIG. 3 is a graph showing the change of firing temperature in case of varying the quantity of $ZnO$ in one of said embodiments; and
FIG. 4 is a graph showing characteristic relations between dielectric constant and temperature coefficient of the ceramic dielectric according to the invention and known ceramic dielectrics.

The defined composition in weight percent of the ceramic dielectric according to the invention is as follows:

| | |
|---|---|
| $CaO \cdot (1.2$–$1.8)TiO_2$* | 20.1–51.5 |
| $Mg_2TiO_4$ | 26.0–10.0 |
| $La_2O_3$ | 33.0–16.4 |
| $Nd_2O_3$ | 1.6–10.6 |
| $Bi_2O_3$ | 4.5–9.0 |
| $ZnO$ | 8.0–2.0 |
| One or more of $CeO_2$, $Pr_6O_{11}$, $Sm_2O_3$ | 6.8–0.5 |

*Note.—May be written thus: $CaO \cdot xTiO_2$ where $x$ is 1.2–1.8.

Some examples of said ceramic dielectric and their characteristics, Q, dielectric constant $\epsilon$, temperature coefficient Tc and firing temperature Tf, are tabulated as follows:

| Test piece No. | Compositions (g) | | | | | | | |
|---|---|---|---|---|---|---|---|---|
| | $CaTiO_3$ | $TiO_2$ | $Mg_2TiO_4$ | $La_2O_3$ | $Nd_2O_3$ | $Bi_2O_3$ | $ZnO$ | $CeO_2$, $Pr_6O_{11}$, $Sm_2O_3$ |
| 1 | 42.5 | 9.0 | 10.0 | 16.4 | 7.0 | 9.0 | 2.0 | 4.1 |
| 2 | 17.4 | 5.8 | 24.2 | 23.4 | 10.0 | 4.8 | 8.0 | 6.4 |
| 3 | 15.1 | 5.0 | 26.0 | 32.7 | 2.0 | 4.5 | 8.0 | 6.7 |
| 4 | 28.0 | 9.0 | 12.0 | 27.1 | 10.4 | 5.0 | 5.0 | 3.5 |
| 5 | 35.8 | 8.1 | 14.5 | 23.2 | 4.3 | 7.2 | 2.0 | 4.9 |
| 6 | 39.1 | 8.8 | 10.3 | 29.3 | 1.6 | 8.5 | 2.1 | 0.5 |

| Test piece No. | Q | $\epsilon$ | Characteristics | |
|---|---|---|---|---|
| | | | Tc($\times 10^{-6}/°$ C.) | Tf(° C.) |
| 1 | 11,000 | 80 | $-260$ | 1,270 |
| 2 | 7,900 | 40 | $+40$ | 1,315 |
| 3 | 4,900 | 34 | $+90$ | 1,335 |
| 4 | 9,800 | 45 | $-3$ | 1,310 |
| 5 | 6,900 | 68 | $-110$ | 1,305 |
| 6 | 6,700 | 66 | $-165$ | 1,290 |

Raw materials of each said composition are mixed and powdered, and then provisionally fired at about 1,100° C. Next, after being finely powdered, they are mixed with a suitable binding material and molded under pressure, and fired at 1,270–1,340° C. in oxidizing atmosphere for about three hours, whereby each said test piece is produced, and electrodes are fixed on both surfaces of said test piece to make an electric condenser. Q and $\epsilon$ have been measured at 1 mc., 25° C. and 70% of humidity, and Tc was measured at the range of $-30$–$+85°$ C.

Each Q of the above stated embodiments of the invention is plotted and line $a$ is obtained as shown in FIG. 1. When each $Nd_2O_3$ in said embodiments is replaced by $La_2O_3$, each Q decreases as indicated by line $a'$. In the embodiment No. 6, as the quantity of $Nd_2O_3$ increases, Q considerably increases to some extent as indicated by line $b$ in FIG. 2. Further, in the embodiment No. 1, as the quantity of $ZnO$ increases, Tf considerably decreases to some extent as indicated by line $c$ in FIG. 3.

The characteristic domain of the ceramic dielectric according to the invention is the part between lines $d$ and $d'$ in the graph showing characteristic relations between $\epsilon$ and Tc, as shown in FIG. 4, in which points 1, 2, 3, 4, 5 and 6 corresponds to the embodiments Nos. 1, 2, 3, 4, 5 and 6, respectively. Lines *e* and *f* indicate characteristics of the known ceramic dielectrics of $MgO\text{-}TiO_2$ system and $CaTiO_3\text{-}MgTiO_3$ system, respectively. It will be apparent from above that the ceramic dielectric according to the invention is superior to such known ceramic dielectrics in various characteristics.

The defined composition of the ceramic dielectric according to the invention is due to the following reasons. If the quantity of $CaO.(1.2\text{--}1.8)TiO_2$ exceeds the upper limit, the dielectric constant decreases, and if said quantity lessens to below the lower limit, firing becomes difficult; if the quantity of $Mg_2TiO_4$ is outside both limits, the required characteristics are not obtained as indicated by line *g* in FIG. 4; if the quantity of $La_2O_3$ exceeds the upper limit, the firing temperature increases, and if said quantity lessens to below the lower limit, the dielectric constant decreases; if the quantity of $Nd_2O_3$ exceeds the upper limit, the dielectric constant decreases, and if said quantity lessens to below the lower limit, Q decreases as shown in FIG. 2; if the quantity of $BiO_2O_3$ exceeds the upper limit, Q decreases, and if said quantity lessens to below the lower limit, the dielectric constant decreases; if the quantity of ZnO exceeds the upper limit, Q decreases, and if said quantity lessens to below the lower limit, the firing temperature considerably increases as shown in FIG. 3; and if the quantity of one or more of $CeO_2$, $Pr_6O_{11}$ and $Sm_2O_3$, each of which serves to widen the range of firing temperature to make firing easy, exceeds the upper limit, Q decreases, and if said quantity lessens to below the lower limit, the range of firing temperature becomes short to make firing difficult.

What we claim is:

1. Ceramic dielectric for temperature compensating electric condensers, which is composed of 20.1–51.5 weight percent of $CaO.xTiO_2$ where $x$ is 1.2–1.8, 26.0–10.0 weight percent of $Mg_2TiO_4$, 33.0–16.4 weight percent of $La_2O_3$, 1.6–10.6 weight percent of $Nd_2O_3$, 4.5–9.0 weight percent of $Bi_2O_3$, 8.0–2.0 weight percent of ZnO, and 6.8–0.5 weight percent of at least one member selected from the group consisting of $CeO_2$, $Pr_6O_{11}$ and $Sm_2O_3$.

References Cited

UNITED STATES PATENTS

| 2,689,185 | 9/1954 | Soyck | 106—39 |
| 2,841,508 | 7/1958 | Roup et al. | 106—39 XR |

LEON D. ROSDOL, *Primary Examiner.*

J. D. WELCH, *Assistant Examiner.*